W. HOOD.
METHOD OF CORRECTING PHOTOGRAPHIC EXPOSURES.
APPLICATION FILED OCT. 15, 1913.
1,182,485.
Patented May 9, 1916.
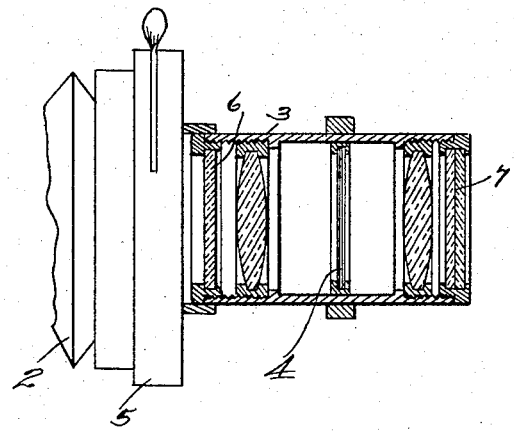
WITNESSES:
F. E. Maynard.
Charles Pickles
INVENTOR
William Hood,
BY G. H. Strong.
ATTORNEY

UNITED STATES PATENT OFFICE.

WILLIAM HOOD, OF SAN FRANCISCO, CALIFORNIA.

METHOD OF CORRECTING PHOTOGRAPHIC EXPOSURES.

1,182,485.  Specification of Letters Patent.  Patented May 9, 1916.

Application filed October 15, 1913.  Serial No. 795,383.

*To all whom it may concern:*

Be it known that I, WILLIAM HOOD, a citizen of the United States, residing in the city and county of San Francisco and State of California, have invented new and useful Improvements in Methods of Correcting Photographic Exposures, of which the following is a specification.

My invention relates to a means for equalizing the high lights and shadows occurring in photographic pictures, so that by such equalization the detail which may occur in the darker shadows will be brought out and given proper effect in the picture without losing such detail or burning out or destroying the effects in the so-called high lights.

It consists in the disposition of what are known as "ray screens" or "filters," such as commonly used with orthochromatic plates and films for compensating the effects of harsh lighting contrasts, and for causing panchromatic plates to render true color values; these screens being so employed in multiple that the effect of high lights and shadows will be so corrected as to bring out detail and render true color values.

The drawing shows a fragmental side elevation of the front part of a camera, with the lens tube in vertical section.

In said drawing, 2 indicates the bellows of the camera, 3 the lens tube, 4 the stop in said tube, and 5 the shutter. At the opposite ends of the lens tube are shown ray screens 6 and 7, the latter being double, that is with a plurality of glass disks, though it is understood that any desired combination of screens may be employed according to the subject.

I have found that, by employing a plurality of ray screens bearing each a definite relation as to "time of exposure," to each other as well as to the speed of plate or film used, and placing them in proper position with respect to the lens, I am enabled to bring the light and color values out in true effect so that the high or bright lights and the shadows will be so equalized, that all the detail of all parts of the picture may be preserved in their correct proportions.

Great difficulty has been experienced, especially in landscape work, in preserving the various details, because in some parts the sun may be shining with a strong light while contiguous or near thereto there might be a deep shadow. If the exposure is made so as to preserve the detail of that portion which is in the sunshine, then the other portion will be simply a blank shadow. If the exposure is made sufficiently long to bring out the detail which may be in the shadow, then the detail of the part in the sunlight will be entirely lost or "burned out" as it is technically called.

Ray filters or screens of course are old. For instance, the Goerz ray screens or filters, of the reddish yellow type, are ordinarily made of three general densities, light, medium, dark, and advertised by the makers to require increased exposures, respectively, of about five, ten, twenty times, or other series of times the exposure suitable without the ray screens. Other well-known makes of ray screens or filters are considered to require different increases of exposure. For the purpose of this application I shall refer to the increased exposures required by these different filters as the exponents of the filters. Thus, in a filter requiring that a plate be given five times the exposure that it would require without the filter, the numeral "5" is considered the exponent of that filter. Likewise in a ten times or twenty times filter, the exponent is, respectively, "10" or "20." But often a more dense ray screen is needed than is on the market. It might, seemingly, suggest itself in such a case to use two ray screens in some manner to get the desired density.

While my invention resides in the use of two or more ray screens, my discovery resides more essentially in the fact that where there are two screens so used the rating for passing light of each screen must be particularly recognized for I have found that the rating of the two or more combined screens is in multiples and not in sums. For instance, if a four times filter and an eight times filter are combined, preferably by placing one on the back and one on the front of the lens the exposure required would not be equal simply to a twelve times filter, but to the multiple of eight and four, that is, a thirty-two times filter. Two sixteen times filters so used become about a two hundred and fifty-six times filter. Two sixteen times filters can be cemented together and mounted in one ring and then act as about a two hundred and fifty-six times filter. This double sixteen times filter can be put on the front of the lens and, for instance, a sixteen times filter put on the back of the lens, or vice versa, and the two together act as about a four thousand and ninety-six times filter, holding back the ultra-violet, violet, blue, and related rays; also facilitating the passage of other rays of light. There are important uses for these dense filters. There is no difficulty in focusing through these dense multiple filters, for the reason that all objects, excepting those in which blue or related colors predominate, are brightly seen. These multiple ray screens used with panchromatic plates, even unbacked plates, enable results to be obtained analogous to those intended to be obtained on the Hydra and panchromatic Hydra plates of the Paget Prize Plate Company, including practical immunity from over-exposure and freedom from halation, even to the extent of enabling a picture to be taken of an interior, including large windows with bright sunshine coming through them, and including good delineations of the outside landscape seen through the windows. The action of these multiple ray screens is the reverse of what might be expected, in some important particulars. For instance, if an exposure has been properly decided on, with a one hundred and twenty-eight times ray screen, to include a shaded porch, with wooded mountain landscape seen through the arches of the porch, and it is decided to considerably increase the exposure in the dark portions of the foreground and slightly decrease it for the mountains, it can be done on a panchromatic plate by substituting a higher multiple ray screen; for instance, a two hundred and fifty-six times screen for the one hundred and twenty-eight times screen, using exactly the same time of exposure and diaphragm diameter. The results can be further modified in the way of softening direct sunshine, etc., or the reverse, by slight decreases or increases of actual time of exposure. Panchromatic plates of different makes vary slightly when used with these multiple screens, particularly in the effect on the high lights, and require slightly varied treatment. Similar results can be obtained with any partially color-corrected plate or film up to the limit of their color corrections. The use of panchromatic plates and multiple ray screens, as described, in effect controls the lighting and enables the photographer to render satisfactorily subjects of extreme difficulty.

One example will serve to illustrate the method of use of panchromatic plates and multiple screens in combined semi-interior and landscape work. Subject, veranda: all interior detail desired by owner. Adjacent garden and grass plots and ornamental trees; complete detail desired. Distance, wooded hills; outline of spurs and ridges and the nearer trees to be clear: sun sixty degrees to one side of the line of sight and shining strongly through openings of veranda upon its floor, chairs, etc. With Wynne actinometer. Plate speed U. S. 576. Correct exposure without any filter with plate speed stop for the wooded hills, one and one-half seconds. Correct exposure with ordinary single filter for approximately correct color rendering, for instance, with a filter, the exponent of which is eight, and with plate speed stop, for the darkest detail to be shown inside the veranda, five minutes and fifteen seconds, being three hundred and fifteen seconds, which is two hundred and ten times one and one-half seconds. Use two hundred and ten times filter applied to the one and one-half seconds wooded hill exposure, which gives correct exposure for U. S. 576 stop as three hundred and fifteen seconds. If actual exposure of the same subject and under the same conditions is to be made with, for instance, U. S. 64 stop instead of a 576 stop, the exposure time would then be thirty-five seconds, modified slightly, as usual, for the focal length used versus the equivalent focus, this being due to the fact that since the diaphragm areas of uniform system, (U. S.) stops vary inversely as the stop numbers, the proper exposures are related directly as their stop numbers. The resulting plate will be ideal for the part of the veranda where the exposure time was five minutes and fifteen seconds, and for all other parts of the view. If it should be desired to include some still darker detail inside the veranda, use the same exposure and a more dense multiple filter, two hundred and fifty-six times for instance, which will slightly reduce the density of the part of the plate showing the wooded hills, with slight increase of their detail. If exactly the multiple filter that ought to be used is not at hand, the nearest available will give essentially the same plate, using by preference a more dense rather than a lighter multiple filter or ray screen.

Analogous methods for various classes of subjects can readily be worked out, and experience with the different makes of panchromatic plates and partially color-corrected plates and films will give the best way to expose each sort as to extreme contrasts, etc.

The invention may be said to reside in recognizing the relationship existing between the filters and the exposure required for the different parts of the picture, so that the time required for the high-lights in a picture under ordinary conditions is first determined; likewise, the time required for approximately correct color rendering exposure of the shadows: the greater time being divided by the less, which gives the product of the exponents of the two, or more filters, which should be used.

Having thus described my invention, what I claim and desire to secure by Letters Patent is—

The method of correcting photographic exposures, which consists in determining the time of exposure required for the highest light portion of the picture, determining the time of exposure required for approximate color rendering with full detail of the darkest portion of the picture which it is desired to so render, and dividing the greater time by the least time to obtain the exponent of the composite or multiple ray screen or filter to be used, which exponent is the product of the exponents of all the filters that are used.

In testimony whereof I have hereunto set my hand.

WILLIAM HOOD.

Copies of this patent may be obtained for five cents each, by addressing the "Commissioner of Patents, Washington, D. C."